United States Patent Office 2,941,395
Patented June 21, 1960

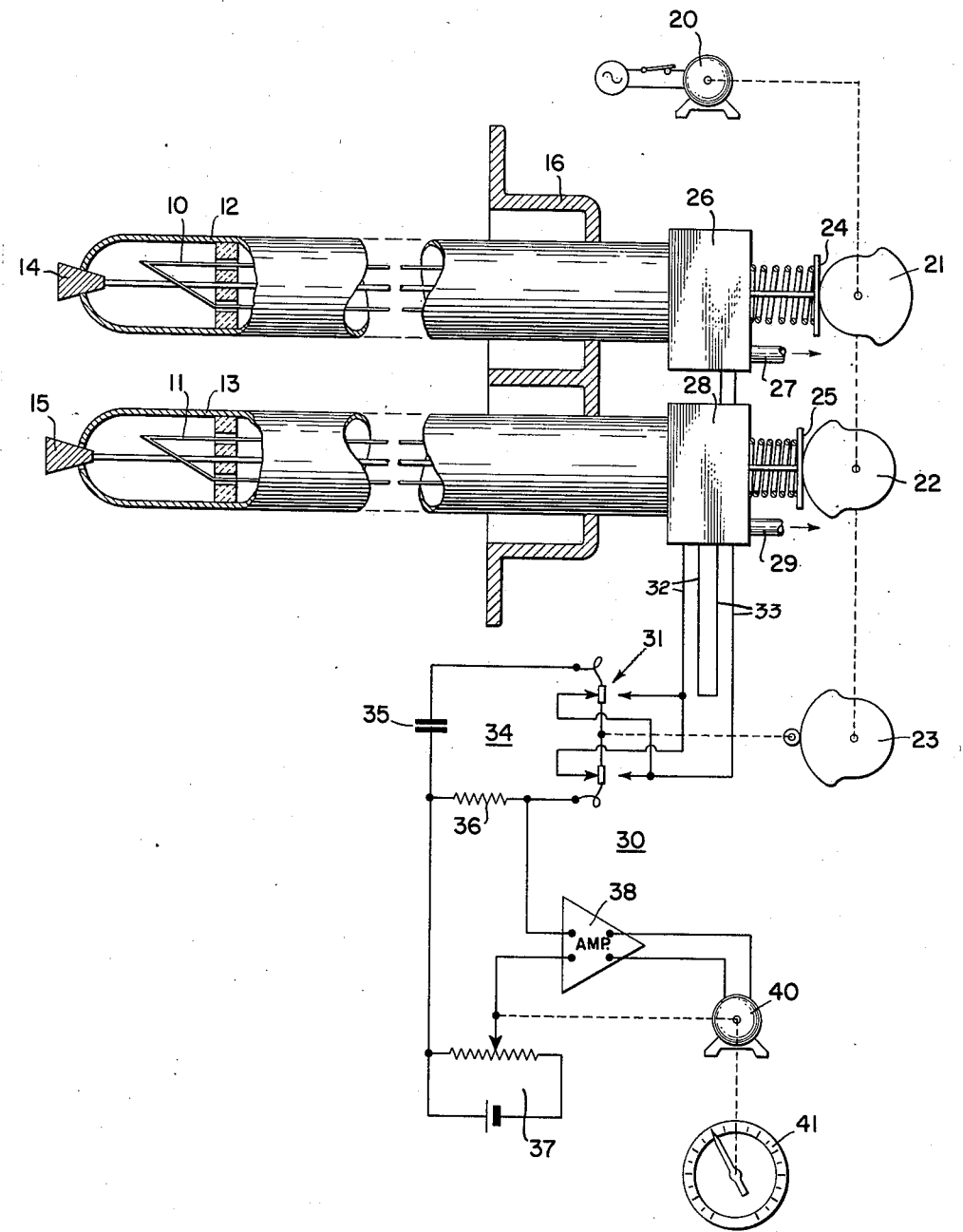

2,941,395

CONSTITUENT POTENTIAL MEASURING APPARATUS

Jay Leland Myer, Coopersburg, Pa., assignor to Minneapolis-Honeywell Regulator Company, Minneapolis, Minn., a corporation of Delaware Filed July 21, 1955, Ser. No. 523,591

5 Claims. (Cl. 73—23)

A general object of the present invention is to provide a new and improved apparatus for measuring and/or controlling a gaseous atmosphere. More specifically, the present invention is concerned with an improved gaseous atmosphere analyzing apparatus useful particularly in a heat treating atmosphere where it is desired to measure and/or control the constituent potential of the heat treating atmosphere. Further, the apparatus is characterized by its adaptability for use in measuring the rate of change of the constitutent potential of a component of an atmosphere as well as to compensate for other gaseous components in the atmosphere.

Heat treating atmospheres are widely used for forming on metals special surfaces which cause the metals to assume certain desirable characteristics. Iron, and its various alloys, represent one of the most widely heat treated metals with the heat treating usually involving a carburizing or a nitriding operation. The heat treating operation is generally carried out in special heat treating furnaces where the atmosphere within the furnace may be controlled. In the case of a carburizing heat treating furnace, a carbon bearing atmosphere is effective to deposit carbon on the surface of the metal and the metal is adapted to absorb the carbon below the surface in accordance with the amount of carbon available in the atmosphere. The measure of the carburizing action of an atmosphere is frequently referred to as the carbon potential of the atmosphere. If the carbon potential of the atmosphere is higher than that of the metal being treated, the carbon will be transferred from the atmosphere into the metal. Conversely, if the carbon potential is lower than that of the metal, carbon will be transferred from the metal to the atmosphere.

An accurate measure of the carbon potential of the atmosphere is useful in determining how the atmosphere is reacting on the material which is being heat treated. In a copending application of Richard B. Beard, Serial No. 389,418, filed October 30, 1953, for "Measuring Apparatus," there is disclosed a carbon potential measuring apparatus which utilizes a thermoelectric element as the carbon potential sensing means. The thermoelectric sensing means utilizes a pair of dissimilar metals, one of which is adapted to readily pick up the heat treating constituent or to give it up as the constitutent potential of the heat treating atmosphere is varied.

In the present invention, a pair of thermoelectric constituent potential measuring means are utilized for determining the constituent potential in the associated heat treating atmosphere. It has been found that an effective manner of measuring the carbon potential of the atmosphere may be effected by measuring the rate at which the output signal from the carbon potential sensing means changes after it has been placed in a heat treating or carburizing atmosphere. An effective manner of accomplishing this is to insert the constituent potential measuring means into the atmosphere with the element starting with substantially no heat treating constituent present on or within the sensing element. With this arrangement, the rate at which the element will come into a state of equilibrium with the heat treating atmosphere will be dependent upon the constituent potential of the heat treating atmosphere.

It is therefore a further object of the present invention to provide a new and improved constituent potential measuring apparatus wherein the sensing element is effectively inserted into the heat treating atmosphere from the condition in which no heat treating action is taking place so that the constituent potential of the atmosphere may be measured by the rate of change of the signal produced by the sensing element.

In accordance with the teachings of the present invention, a pair of constituent potential sensing elements are utilized with one of the elements being arranged for direct exposure to the heat treating atmosphere while the other element is placed in a hydrogen atmosphere wherein the heat treating constituent will be removed therefrom. Following the operation of the apparatus in this manner for a predetermined length of time, the position of the elements is reversed so that the element which was formerly in the hydrogen atmosphere is now placed in the heat treating atmosphere and the element which was in the heat treating atmosphere is now placed in the hydrogen atmosphere.

It is therefore a more specific object of the present invention to provide an improved constituent potential measuring apparatus incorporating a pair of constituent potential measuring means wherein the sensing means are alternately subjected to a heat treating atmosphere and a non heat treating atmosphere so that while one element is being heat treated, the other element is having the heat treating constituent removed therefrom.

Still another object of the present invention is to provide an improved constituent potential measuring apparatus wherein a first and a second constituent potential means are adapted for alternate insertion into atmospheres which are heat treating and non heat treating in character.

Still another object of the present invention is to provide an improved atmospheric analyzing apparatus utilizing a pair of gaseous constituent potential sensing means wherein one of the sensing means is arranged for direct positioning for exposure to the atmosphere to be analyzed and the other is placed within a protective chamber wherein the chamber is filled with a single gaseous component which is present in the atmosphere to be analyzed.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Referring to the single figure, the numerals 10 and 11 represent atmospheric sensing elements useful particularly in sensing the constituent potential. These elements are shown as thermoelectrical junctions and may, for example, take the form of an iron-constantan junction. Each of these junctions is effective when the iron of the junction absorbs carbon to produce a shift in the potential output of the junction which is indicative of the amount of carbon absorbed thereby.

The constituent potential sensing means 10 and 11 are each mounted within hollow tubes of palladium 12 and 13, respectively. The palladium tubes 12 and 13 are particularly adapted for use in the present apparatus in that palladium has a very high selective permeability for hydrogen. Consequently, insofar as hydrogen gases in the atmosphere are concerned, they will readily permeate hydrogen to the space inside of the elements 12 and 13.

The tube 12 has a valving member 14 extending through an opening in the end of the tube to provide a means for opening and closing the tube to the gaseous atmosphere. As shown in the drawing, valve member 14 is sealing the end of the tube 12 so that the heat treating atmosphere will not be allowed to go inside of the tube. Tube 13 has its outer end adapted to be closed by a valving member 15. As shown, this valving member is open so that all of the gases surrounding the tube will be free to enter the tube.

The tubes 12 and 13 are adapted to be supported by a suitable mounting bracket 16 which may be fastened upon the wall of a heat treating furnace so that the tubes 12 and 13 will project through the wall and into the atmosphere which is to be analyzed.

The valving members 14 and 15 are adapted to be controlled by a timing motor 20 which drives a plurality of cams 21, 22, and 23. The cams 21 and 22 cooperate with a pair of spring biased follower surfaces 24 and 25. The springs associated with each of the follower surfaces 24 and 25 are effective to bias the valving members 14 and 15 into a closed position with the respective cams being operative to open the associated valving members.

Supported on the ends of tube 12 is a tube enclosing member 26 which may contain suitable sealing means so that motion may be transmitted from the follower 24 to the valving member 14. Block 26 further includes an exhaust port 27 which is adapted to be connected to a suitable exhausting pump, not shown. Positioned on the end of the tube 13 is a further block 28, the latter of which also has suitable sealing means so that the motion of the follower 25 may be transmitted to the valving member 15. Block 28 further contains an exhausting port 29 which is likewise adapted to be connected to a suitable exhaust pump, not shown. Both of the blocks 26 and 28 have suitable electrical outlets so that the thermoelectric constituent potential sensing means 11 may be suitably connected to a measuring apparatus 30. The measuring apparatus includes a signal reversing switch 31 which is connected on its input side to the thermocouple leads 32 and 33. The output side of the reversing switch 31 is connected through a rate taking network 34, comprising a condenser 35 and a resistor 36. The signal across the resistor 36 is compared with a signal from a balancing network 37 and the difference is applied to an amplifier 38. The amplifier 38 produces a reversible motor drive signal for a rebalancing motor 40, the latter of which is arranged to readjust the balancing network 37 and to position a suitable indicator mechanism 41. The self balancing potentiometric circuit may well take the form of the apparatus disclosed in the Walter P. Wills Patent 2,423,540, issued July 8, 1947. While only indication is shown, the apparatus is well adapted for use for controlling purposes with the motor 40 producing the necessary motion useful in providing a regulation of the atmosphere which is affecting the sensing elements 10 and 11.

In considering the operation of the present apparatus, it should first be noted that with the apparatus in the position shown upon the drawing with the valve member 14 closing the end of the tube 12 and the valve member 15 opening the end to the tube 13, the atmospheric conditions surrounding the respective thermocouples 10 and 11 will be different. Assuming that the element 10 has been subjected to the heat treating atmosphere immediately prior to the closing of the valve member 14, the closing of the valve member 14 will effectively remove the element 10 from communication with the heat treating atmosphere. As the tube 12 is formed of palladium, hydrogen will diffuse therethrough from the heat treating atmosphere and will be withdrawn from the exhausting port 27. In a very short interval of time all of the heat treating gases which were within the tube 12 will be exhausted and the gas within the tube 12 will be substantially pure hydrogen. With the hydrogen surrounding the element 10, the element will tend to give up the carbon which had been picked up by the element and exposed to the heat treating atmosphere and the carbon will combine with the hydrogen present to form methane. The methane will in turn be drawn off through the exhausting port 27 and will be replaced with new hydrogen drawn in through the walls of the tube 12, thus purging the tube and the element of carbon. With the element 10 giving up carbon to the surrounding hydrogen gas, the thermoelectric potential of the element 10 will decrease at a rate dependent upon the partial pressure of the hydrogen present in the tube 12 as well as the amount of carbon that had been absorbed thereby during the previous half cycle. In the absence of some further control action, the element 10 would give up substantially all of its carbon.

With the apparatus as shown upon the drawing, the tube 13 is opened on its inside to the heat treating atmosphere since the valve member 15 is in its open position as forced there by the valve actuating cam 22 operating upon the follower 25. When the valve member 15 is open, the heat treating gases are all free to travel inside of the tube 13 and on out through the exhausting port 29. The presence of the heat treating gases within the tube 13 will react with the constituent potential sensing element 11 and this element will pick up the heat treating constituent in accordance with the constituent of the atmosphere. The rate at which this will take place will be a direct function of the magnitude of the constituent potential in the atmosphere. With the increase in the amount of carbon absorbed by the element 11, there will be a resultant increase in the potential on the output of the element. With this potential increasing, the rate of increase will be directly indicative of the magnitude of the constituent potential or the carbon potential of the associated heat treating atmosphere. Normally, the element 11, if exposed for a long enough period of time to the atmosphere, will come into equilibrium with the atmosphere so that this output potential will no longer change. Since the present apparatus is arranged to operate upon a rate of change principle, the apparatus is preferably not operated until a condition of equilibrium has been reached.

Considering the operation of the two elements 10 and 11 together, it should be noted that the elements are connected in potential opposition so that when the potential of one of the elements is increasing, the potential of the other is decreasing. Consequently, the resultant changes will be additive to produce a larger net rate of change signal for use in the measuring circuit 30.

With the apparatus in the position shown upon the drawing, and assuming that a change has just been effected in the atmosphere as applied to the elements 10 and 11, the electrical outputs from the elements 10 and 11 by way of leads 32 and 33 respectively will be applied by way of the reversing switch to the rate taking circuit 34. There will be produced across the resistor 36 a direct current potential which will be proportional to the rate of change of the signals arising from the elements 10 and 11. The potential on the resistor 36 as well as the potential from the balancing network 37 will be applied to the amplifier 38 and the motor 40 will be readjusted until the balancing network 37 has balanced the potential from the resistor 36. The signal indicated by the indicator 41 will be indicative of the rate of change of the potentials of the elements 10 and 11 and this rate of change will in turn be a function of the magnitude of the constituent potential of the heat treating atmosphere.

On the next half cycle of the apparatus, the timing motor 20 will have rotated the valving cams 21 and 22 and the switching cam 23 to a position 180° reversed from that shown in the drawing. Under these conditions, the valving member 14 will now be open and the valving member 15 will be closed. This will mean that the element 10 will now be exposed to the atmospheric gases being drawn in through the open end of the tube 12 and the element 11 will be exposed only to the hydrogen which permeates through the tube 13. Inasmuch as the potentials from the elements 10 and 11 will now be moving in the opposite direction, the reversing switch 31 is effective to reverse the polarity of the leads 32 and 33 in their application to the network 34 so that the potential appearing across the resistor 36 will be of the same polarity as it was during the first half cycle considered above. As before, the potential across the resistor 36 is compared with the potential across the rebalancing network 37 and any difference will appear on the input of the amplifier 38 which will adjust the motor 40 in a rebalancing direction to balance the potential in the network 37 against that of the resistor 36.

The apparatus will operate in the aforementioned manner with the timer 20 being effective to periodically reverse the atmospheres affecting the sensing elements 10 and 11. It will be noted that since both the elements 10 and 11 are projecting into the atmosphere where the constituent potential is being determined, both are subjected to substantially the same temperature and consequently any thermal E.M.F. from the thermocouple elements will be balanced. Further, since both of the sensing elements 10 and 11 are exposed to hydrogen, the effect of hydrogen upon varying the junction potential of the elements will also be effectively cancelled out.

While the apparatus has been shown utilizing gaseous permeable elements with valving elements in the ends thereof for periodically reversing the atmospheres on the sensing elements, it will be readily apparent that there are numerous ways of effecting such a reversal such as physically moving the sensing elements from one type of atmosphere into the other. Further, while a single sensing element combination has been shown, it will be readily apparent that in applying apparatus of the present type to a heat treating furnace, it may be desirable to provide a plurality of devices of the present type spaced at advantageous points about the furnace to obtain an effective averaging effect of the heat treating condition of the atmosphere in the furnace.

While, in accordance with the provisions of the statutes, there has been illustrated and described preferred embodiments of the invention, it will be apparent to those skilled that changes may be made in the forms of the apparatus disclosed without departing from the spirit of the invention as set forth in the appended claims and that in some cases, certain features of the invention may be used to advantage without a corresponding use of other features.

Having now described the invention, what is claimed as new and for which it is desired to secure by Letters Patent is:

1. In combination, a pair of signal producing gaseous constituent potential measuring elements, and periodically actuated means for exposing each of said pair of elements alternately to a heat treating atmosphere having a preselected constituent therein and an atmosphere where said constituent is not present, means connecting said elements in series opposition, and a signal rate of change measuring means connected serially with said pair of elements to produce a signal indicative of the rate of change of the constituent affecting said pair of elements.

2. In combination, a pair of signal producing carbon potential measuring elements, periodically actuated means for changing the atmosphere surrounding said elements, said means shifting the atmosphere about said elements between a carbon heat treating atmosphere and a hydrogen atmosphere so that while one of said elements is exposed to the heat treating atmosphere the other is exposed to the hydrogen atmosphere, means connecting said elements in series opposition, and carbon potential indicating means responsive to signals produced by said elements connected serially with said pair of elements, said indicating means including means for measuring the rate of change of the constituent potential indicated by said pair of measuring elements.

3. Apparatus for measuring the constituent potential of a heat treating constituent in a heat treating atmosphere comprising a first and a second detector element each including means for producing electrical signal variations in accordance with the amount of the constituent sorbed thereby, means for alternately exposing alternate ones of said detector elements to said heat treating atmosphere and to a purging constituent of said atmosphere, means for connecting said elements in series opposition for combining said signals from said detectors to produce a differential signal, and means for determining the rate of change in said differential signal as a measure of said constituent potential.

4. Apparatus for measuring the constituent potential of a heat treating constituent in a heat treating atmosphere comprising a pair of detector elements each including means for producing an electrical signal variation in accordance with the amount of said constituent sorbed thereby, means for alternately and periodically exposing alternate ones of said detector elements to said heat treating atmosphere and to a purging constituent from said atmosphere, means for connecting said elements in series opposition for combining said signals from said detectors to produce a differential signal, and means for determining the rate of change in said differential signal as a measure of said constituent potential.

5. Apparatus for measuring the constituent potential of a heat treating constituent in a heat treating atmosphere comprising a first and a second detector element each including means for producing electrical signal variations in accordance with the amount of said constituent sorbed thereby, means defining a first protective chamber surrounding one of said elements, means defining a second protective chamber surrounding the other of said elements, each of said chambers having an opening for exposing the interior thereof to said atmosphere, closure means for closing each of said openings, said chamber defining means being permeable to a purging constituent of said atmosphere, means for alternately opening and closing said closure means alternately for periodically and alternately exposing said detector elements to said heat treating atmosphere, means for connecting said two elements in series opposition for combining the signals from said two detectors to produce a differential signal, and means for determining the rate of change of said differential signal as a measure of said constituent potential.

References Cited in the file of this patent

UNITED STATES PATENTS

| | | |
|---|---|---|
| 1,559,461 | Ruben | Oct. 27, 1925 |
| 2,579,352 | White | Dec. 18, 1951 |
| 2,698,222 | Davis | Dec. 28, 1954 |
| 2,811,037 | Beard | Oct. 29, 1957 |